(12) United States Patent
Kusunoki

(10) Patent No.: US 6,370,444 B1
(45) Date of Patent: Apr. 9, 2002

(54) DISC LIBRARY APPARATUS

(75) Inventor: Yoshiaki Kusunoki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/361,184

(22) Filed: Jul. 27, 1999

(30) Foreign Application Priority Data

Sep. 30, 1998 (JP) .......................................... 10-277593

(51) Int. Cl.$^7$ ................................................ C06F 7/00
(52) U.S. Cl. ...................... 700/214; 700/216; 700/217
(58) Field of Search ............................. 700/214, 216, 700/217

(56) References Cited

U.S. PATENT DOCUMENTS

| | | | |
|---|---|---|---|
| 4,553,211 A | * 11/1985 | Kawasaki et al. | 364/479 |
| 4,677,565 A | * 6/1987 | Ogaki et al. | 364/479 |
| 4,827,463 A | * 5/1989 | Motoyoshi et al. | 369/36 |
| 4,866,661 A | * 9/1989 | De Prins | 364/900 |
| 5,020,958 A | * 6/1991 | Tutobane | 414/281 |
| 5,206,814 A | * 4/1993 | Cahlander et al. | 364/478 |
| 5,561,604 A | * 10/1996 | Buckley et al. | 364/479.05 |
| 5,726,828 A | * 3/1998 | Kakuta et al. | 360/98.01 |
| 5,761,530 A | * 6/1998 | Funahashi et al. | 395/835 |
| 5,790,485 A | 8/1998 | Bando | |
| 5,831,947 A | * 11/1998 | Okazki et al. | 369/34 |
| 5,884,298 A | * 3/1999 | Smith, II et al. | 707/2 |
| 5,907,532 A | * 5/1999 | Taylor | 369/192 |
| 6,243,346 B1 | * 6/2001 | Furkawa et al. | 369/75.1 |

FOREIGN PATENT DOCUMENTS

| | | | | |
|---|---|---|---|---|
| EP | 0703578 A2 | * | 3/1996 | G11B/17/22 |
| EP | 0703578 A2 | * | 3/1996 | G11B/17/22 |
| EP | 0 834382 | | 4/1998 | |
| JP | 4-220158 | * | 3/1994 | G11B/17/00 |
| JP | 6 068582 | | 3/1994 | |
| JP | 7-051361 | * | 3/1996 | G11B/17/22 |
| JP | 8-249136 | * | 8/1996 | G06F/3/06 |
| JP | 9 82072 | | 3/1997 | |
| JP | 9-82072 | * | 3/1997 | G11B/27/10 |
| JP | 10-149399 | * | 6/1998 | G06F/19/00 |

* cited by examiner

*Primary Examiner*—Christopher P. Ellis
*Assistant Examiner*—Michael E. Butler

(57) ABSTRACT

A disc library apparatus has shelves for storing discs, at least one drive for accessing information on the discs, a motor-driven carrier that transports discs between the shelves and the drive, and a control unit. The carrier has a sensor for sensing discs. Each drive preferably has a stopper for restraining ejected discs. In a first aspect of the invention, the sensor also senses the stoppers of the drives, and a drive without a stopper is not used. In a second aspect of the invention, the control unit uses the sensor to acquire and update information giving the positions of the drives, as well as the positions of the discs. In a third aspect of the invention, the sensor is a reflective optical sensor.

15 Claims, 10 Drawing Sheets

DISC LIBRARY APPARATUS

BACKGROUND OF THE INVENTION

The present invention relates to a disc library apparatus, more particularly to the sensing of the positions of discs and drives in the apparatus.

A disc library apparatus is a type of mass storage device having shelves on which discs are stored, at least one disc drive (hereinafter, simply 'drive') for accessing information on the discs, and a mechanism for automatically transporting a selected disc to and from a selected drive. The disc transport mechanism has a movable carrier with various sensors, including a position sensor for sensing the position of the carrier, a chucking sensor for sensing that a disc has been picked up, and a disc sensor for sensing the presence of a disc on a shelf, or the presence of a disc ejected from a drive. The disc sensor is conventionally a transmissive optical sensor that detects a disc when the disc interrupts a light path between a light-emitting element and a light-sensing element.

The apparatus also has a control unit with firmware stored in, for example, a read-only memory (ROM). The firmware includes programs that initialize the apparatus at power-up, control communication with a host device, control the disc transport sequence, handle errors, and carry out various other processing. The firmware also includes information giving the positions of the shelves and the position of each drive.

In commands from the host device, the shelves and drives are identified by addresses. When the control unit receives a command to use a designated drive to access information on a disc on a designated shelf, the control unit controls the disc transport mechanism so as to move the carrier to the known position of the designated shelf, pick up the disc, carry the disc to the known position of the designated drive, and insert the disc into the drive. These operations are repeated in reverse after the desired information has been accessed.

When a command of this type is executed, the addresses must be valid; that is, there must be a disc on the designated shelf, and the designated drive must be able to accept the disc. The presence of discs on shelves can easily change, as discs are added to or removed from the library. In many cases, the discs are stored in removable magazines, each having a plurality of shelves, so when a magazine is added, removed, or replaced, the status of a large number of shelves can change simultaneously. The control unit accordingly includes a read-write memory with a table of known disc locations. When a magazine is added or replaced, the control unit moves the carrier so that the disc sensor scans the magazine, detects the presence or absence of a disc on each shelf, and updates the table of disc locations accordingly.

This table enables the control unit to keep track of the locations of discs, but it does not facilitate the installation or removal of drives. Conventional firmware is coded on the assumption that the drives are permanently installed, and that their positions will not change. If a drive is removed, or a new drive is installed, or a drive is moved from one position to another, it becomes necessary to shut down the library apparatus and update the firmware, by replacing the ROM, for example. This creates considerable problems in the operation and maintenance of the apparatus.

Another type of problem occurs when a disc is ejected from a drive. If ejected too forcefully, the disc may damage the disc transport mechanism, or the disc itself may be damaged or dropped. If a disc drops to an unintended location, further problems such as electrical short circuits may occur. As a solution to these problems, a stopper is conventionally mounted together with each drive, positioned to prevent the disc from being ejected too far. This solution is imperfect, however, because the stopper may be bent or moved out of place after being installed, or may fail to be installed at all because of human forgetfulness.

The sensors are also a source of problems in that they constrain the mechanical design of the shelves, carrier, drives, and stoppers. In particular, the use of a transmissive optical sensor as the disc sensor imposes design constraints. Precise alignment of the light-emitting and light-sensing elements in this sensor is also necessary.

SUMMARY OF THE INVENTION

An object of the present invention is to prevent accidents caused by disc ejection.

Another object is to simplify the installation and removal of drives in a disc library apparatus.

Another object is to reduce design constraints due to sensors in a disc library apparatus.

A disc library apparatus according the present invention has shelves for storing discs, at least one drive for accessing information on a disc when the disc is loaded into the drive, and a carrier for carrying discs from the shelves to the drive.

According to a first aspect of the invention, a stopper is installed together with each drive, for restraining discs ejected from the drive. A disc sensor for detecting discs stored on shelves, detecting discs ejected from the drives, and detecting the stoppers is mounted on the carrier. A control unit controls the carrier and the drives, and disables the use of a drive if its stopper is not detected by the disc sensor. The control unit may also disable the use of a drive if its stopper is installed in an incorrect position, as detected by the disc sensor.

According to a second aspect of the invention, a disc sensor is mounted on the carrier. The control unit includes a memory unit and a processor unit. The memory unit stores drive information indicating the positions of installed drives, and disc information indicating the current positions of discs. The processor unit automatically acquires and updates the drive information and disc information by moving the carrier to the positions of the drives and shelves, using the disc sensor to detect the drives, detect discs ejected from drives, and detect discs stored on shelves, and receiving signals from the drives indicating the presence of loaded discs in the drives.

According to a third aspect of the invention, a reflective optical sensor is mounted on the carrier. The reflective optical sensor detects discs stored on the shelves, and discs ejected from the drives, and notifies a control unit that controls the carrier and drives. The same reflective optical sensor may also detect discs that have been picked up and are being carried by the carrier.

Accidents due to disc ejection are prevented by detecting the presence and absence of the stoppers, and by detecting whether the stoppers are correctly installed.

The installation and removal of drives is simplified by detecting the positions of installed drives and updating the drive information automatically.

Design constraints due to sensors are reduced by the use of a reflective optical sensor as the disc sensor.

DETAILED DESCRIPTION OF THE INVENTION

Figure 1:
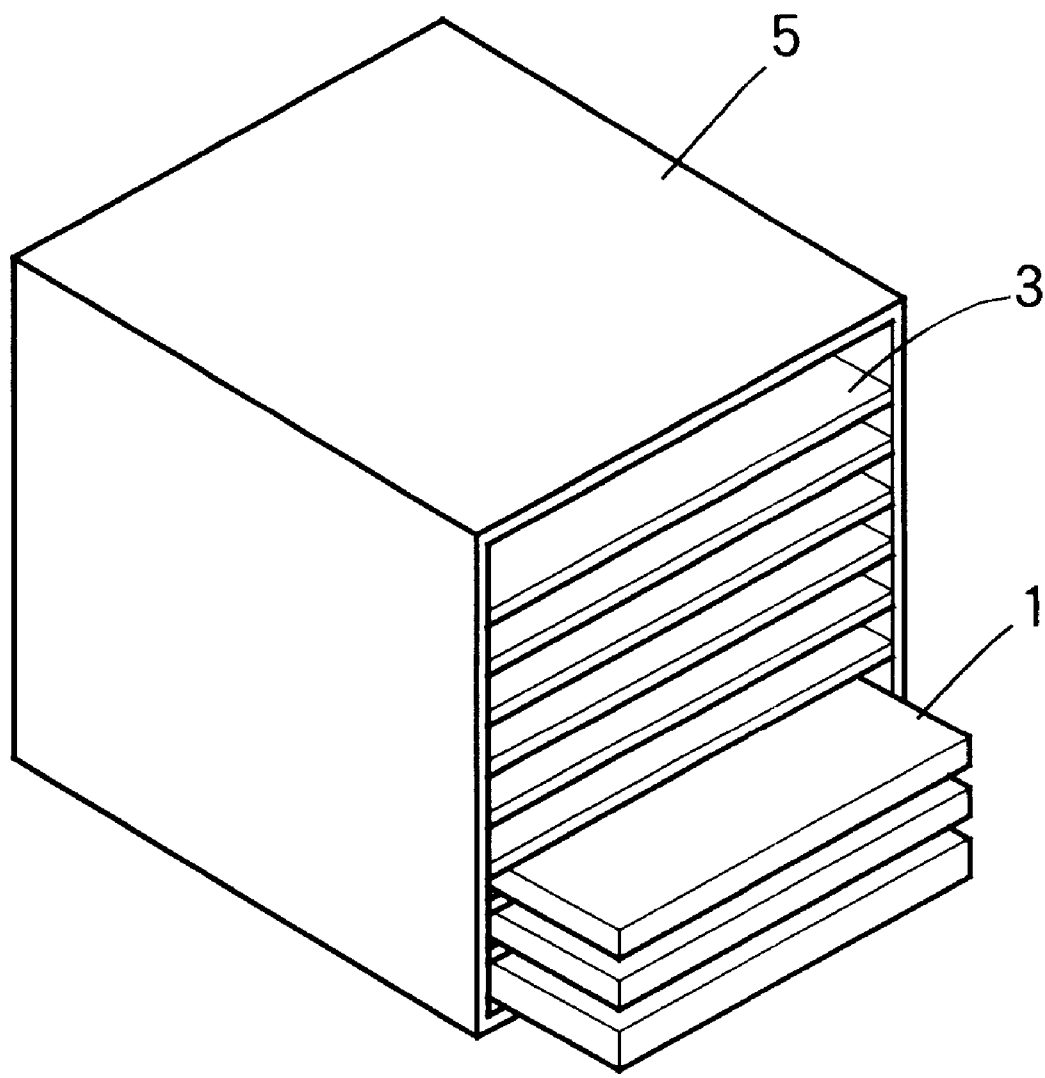
FIG. 1 is a perspective drawing of a magazine.

Embodiments of the invention will be described with reference to the attached drawings, in which like parts are indicated by like reference characters. Elements and operations common to the embodiments will be described first.

Referring to FIG. 1, discs 1 are stored on shelves 3 in a magazine 5. The discs are circular rotating storage media of, for example, the optical or magneto-optical type. The circular discs themselves are not visible because they are enclosed in square cases or caddies. The combined assembly of a disc and its caddy will be referred to as a disc 1.

Figure 2:
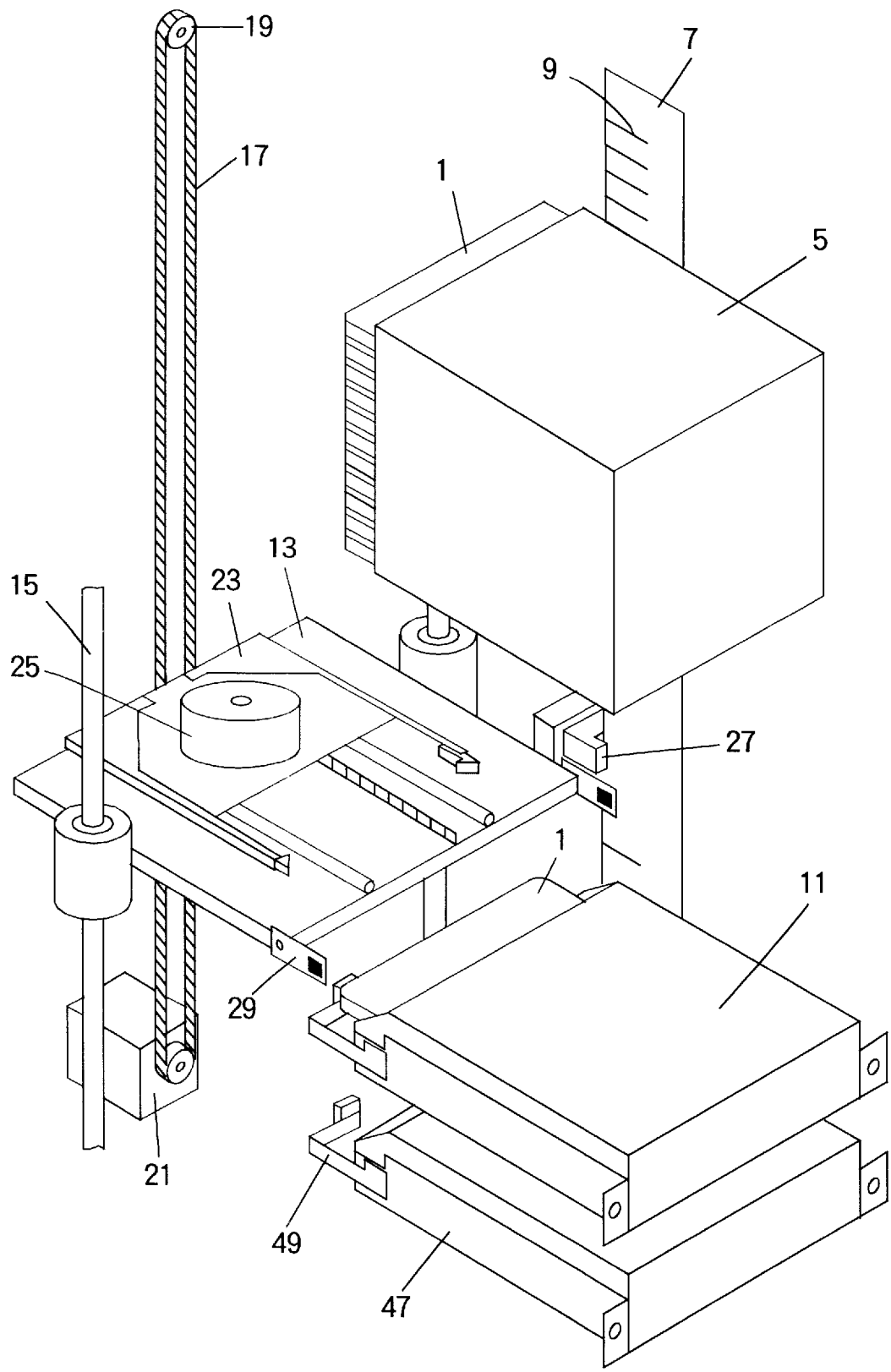
FIG. 2 is a perspective drawing of a disc library apparatus illustrating the first and second embodiments of the invention.

Referring to FIG. 2, the magazine 5 is removably mounted in the disc library apparatus adjacent a slit plate 7. The positions of the shelves 3 in the magazine 5 correspond to the positions of slits 9 in the slit plate 7. Installed below the magazine 5 is at least one drive 11. The positions at which drives 11 are installed also correspond to the positions of slits 9 in the slit plate 7. Each drive 11 has facilities (not visible) for detecting the presence of a loaded disc 1, reproducing information recorded on the disc, and ejecting the disc. A drive 11 may also have facilities for recording information on a disc 1. The recording and reproducing of information will be generically referred to below as 'accessing information.' The drives 11 comply with standard small computer system interface (SCSI) specifications.

Discs 1 are transported between the magazine 5 and drives 11 by a carrier 13 that is slidably mounted on a pair of vertical guide shafts 15. The carrier 13 is attached to a vertical belt 17 that is driven around pulleys 19 by a belt motor 21. The carrier 13 is equipped with a picker 23 driven by a picker motor 25. The picker 23 moves forward to pick up discs 1 from the magazine 5, load discs 1 into the drives 11, and pick up discs 1 ejected from the drives 11. The picker 23 moves to the retracted position shown in the drawing while a disc 1 is being carried by the carrier 13.

The carrier 13 is equipped with a slit sensor 27 that senses the positions of the slits 9 in the slit plate 7. The slit sensor 27 is an optical sensor of the transmissive type, with a light-emitting element and a light-sensing element disposed on opposite sides of the slit plate 7. (The light-emitting element and light-sensing element are not visible in the drawings.) As the carrier 13 moves, the slit sensor 27 generates an electrical signal that goes high, for example, each time the carrier 13 passes a slit 9.

In the first six embodiments, the carrier 13 also has a disc sensor that senses the presence of shelved and ejected discs 1. In the first three embodiments, the disc sensor 29 is an optical sensor of the transmissive type, including a light-emitting element and a light-sensing element disposed on opposite sides of the space occupied by the front parts of discs 1 stored in the magazine 5 or ejected from the drives 11, as shown in FIG. 2. The disc sensor 29 outputs an electrical signal that goes high, for example, when the emitted light is blocked by a disc 1, and is low when the light is not blocked.

Figure 3:
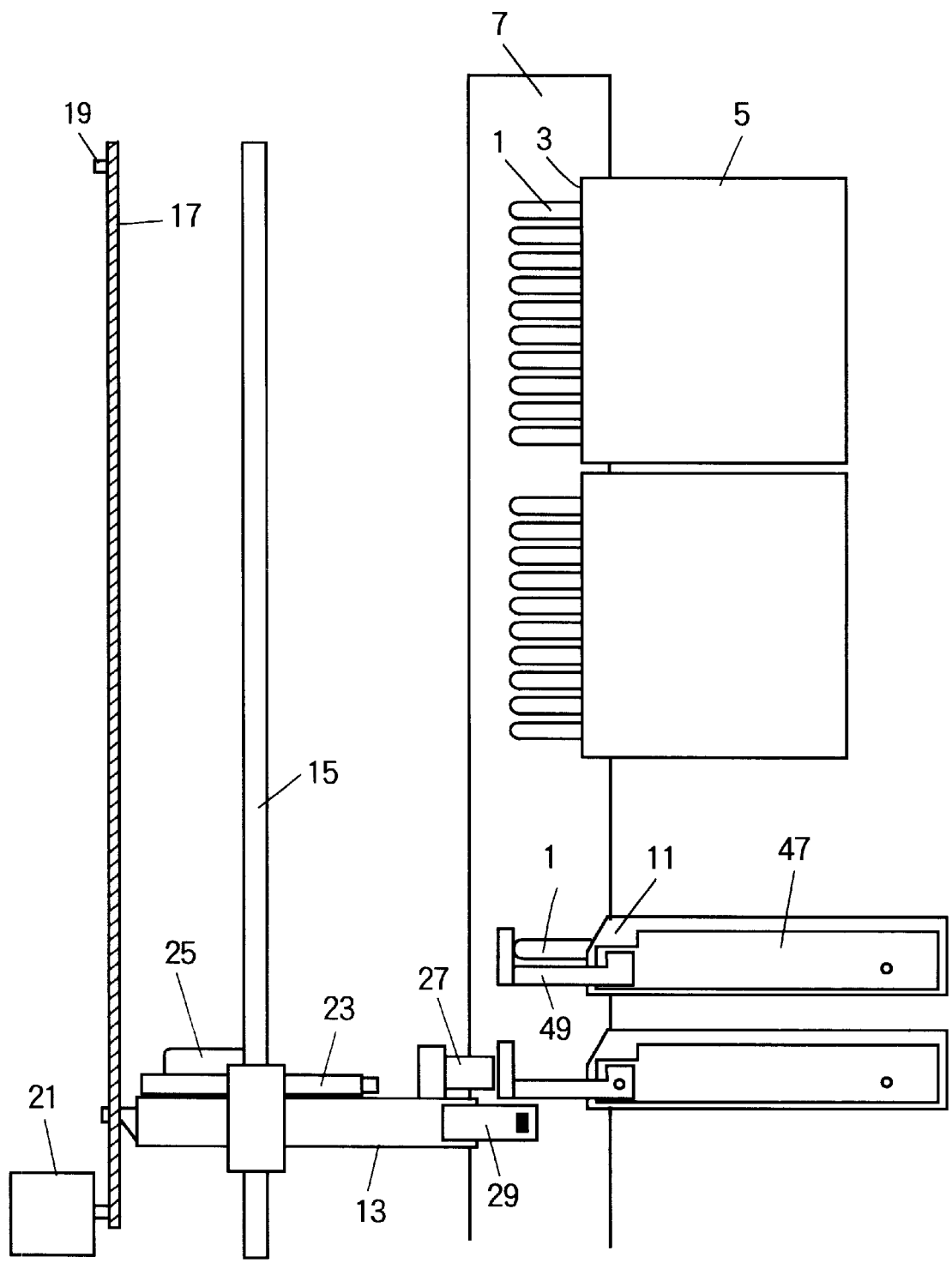
FIG. 3 is a side view of the apparatus in FIG. 2.

Referring to FIG. 3, a plurality of magazines 5 can be installed in the disc library apparatus simultaneously. The magazines 5 and drives 11 are mounted at different heights, aligned directly above one another.

Figure 4:
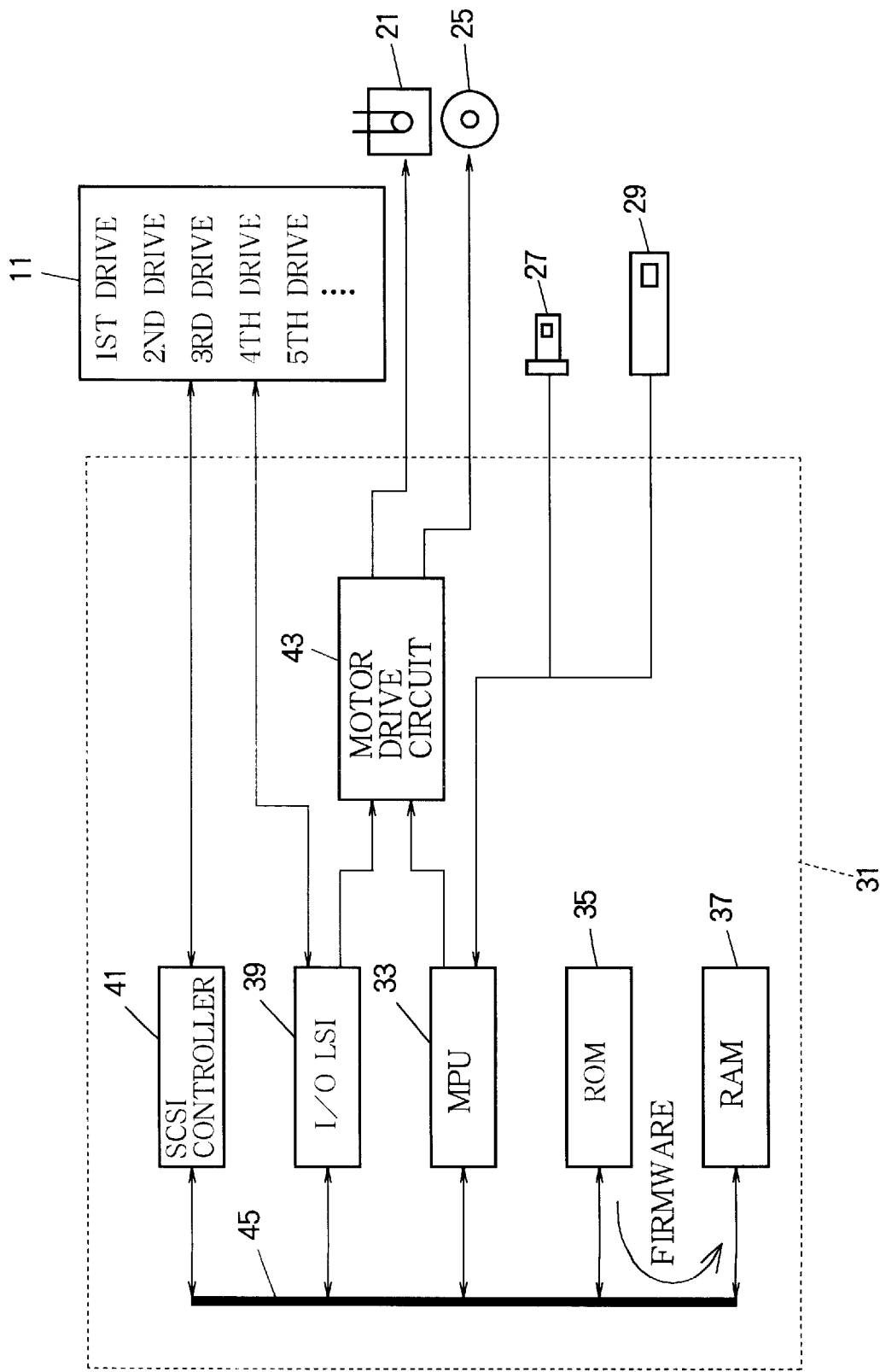
FIG. 4 is a block diagram of the control unit in the disc library apparatus.

The disc library apparatus also includes a control unit (not shown in FIGS. 2 and 3) that controls the belt motor 21, picker motor 25, and drives 11. Referring to FIG. 4, the control unit 31 including a processing unit such as a microprocessor unit (MPU) 33, a ROM 35, a read-write memory unit 37, a large-scale integrated input-output circuit (I/O LSI) 39, a SCSI controller 41, and a motor drive circuit 43. The MPU 33, ROM 35, read-write memory unit 37, I/O LSI 39, and SCSI controller 41 are interconnected by a bus 45, which is also connected to an external host device such as a computer (not visible).

The ROM 35 stores the firmware of the disc library apparatus. When the apparatus is powered up, the firmware is loaded from the ROM 35 into the read-write memory unit 37. During operation, the read-write memory unit 37 also stores drive information indicating the number of installed drives 11 and the positions they occupy, and disc information indicating the positions of shelves 3 on which discs currently reside, the positions of drives 11 in which discs 1 are currently loaded, and the positions of drives 11 in which ejected discs 1 remain. The read-write memory unit 37 including, for example, a combination of volatile and non-volatile memory devices.

The MPU 33 receives signals from the slit sensor 27, and from the disc sensor 29 if present, and controls the apparatus by executing the firmware in the read-write memory unit 37. The I/O LSI 39 transfers information reproduced from the discs 1, or information to be recorded on the discs 1, between the drives 11 and the bus 45. The I/O LSI 39 also receives signals from the drives 11 indicating whether or not they contain loaded discs, and notifies the MPU 33. In addition, the I/O LSI 39 transfers control signals from the MPU 33 to the motor drive circuit 43, which drives the belt motor 21 and picker motor 25. The SCSI controller 41 controls communication among the MPU 33, the drives 11, and the host device.

The host device issues commands in which the drives 11, the shelves 3 in the magazines 5, the carrier 13, and other elements are identified by addresses. A typical command instructs the MPU 33 to load a disc from the n-th shelf into the m-th drive, where m and n are positive integers. To execute this command, first the MPU 33 refers to the disc information in the read-write memory unit 37 to check that there is a disc 1 present on the n-th shelf 3 and a drive 11 is installed at the m-th position, and that the drive 11 does not contain a loaded or ejected disc. If these conditions are met, the MPU 33 moves the carrier 13 from its current position to the n-th shelf position, as determined by counting slits detected by the slit sensor 27, then halts the carrier 13 and activates the picker motor 25. The picker 23 moves forward, grips the disc 1, then moves back, placing the disc 1 on the carrier 13. Next, the MPU 33 moves the carrier 13 to the m-th drive position. Here the picker 23 is again driven forward, inserting the disc 1 into the drive 11, then back, leaving the disc 1 loaded in the drive 11. At this point the MPU 33 receives a signal from the drive 11, via the I/O LSI 39, indicating that the disc 1 has been loaded. The MPU 33 then updates the disc information in the read-write memory unit 37 to indicate the changed location of the disc 1.

Next, the embodiments will be described individually. The first embodiment illustrates the first and second aspects of the invention. The second embodiment illustrates the first aspect. The third embodiment illustrates the second aspect. The fourth embodiment illustrates the third aspect. The fifth embodiment illustrates the first, second, and third aspects. The sixth embodiment illustrates the first and third aspects. The seventh embodiment illustrates the third aspect.

Referring again to FIG. 2, in the first embodiment, the drives 11 are mounted in mounting fixtures 47, together with respective stoppers 49. The apparatus has a total of M predetermined drive positions, corresponding to M slit positions, where M is an integer greater than one. Each drive 11 is installed in one of these positions, but not all of the M positions need be occupied. The lowest slit 9 of the slit plate 7 does not correspond to a drive position, but provides a starting reference for positioning.

The disc sensor 29 in the first embodiment senses both the discs 1 and the stoppers 49 of the drives 11. Referring again to FIG. 3, the stoppers 49 restrain ejected discs 1 at positions where the front edges of the discs are aligned with the front edges of discs 1 stored on the shelves 3 in the magazines 5. The light-emitting and light-sensing elements of the disc sensor 29 are aligned slightly forward of this position, as seen from the carrier 13, so that light can be interrupted by discs 1 stored on the shelves 3, discs 1 ejected from the drives 11, and the supporting arms of the stoppers 49.

Figure 5A:
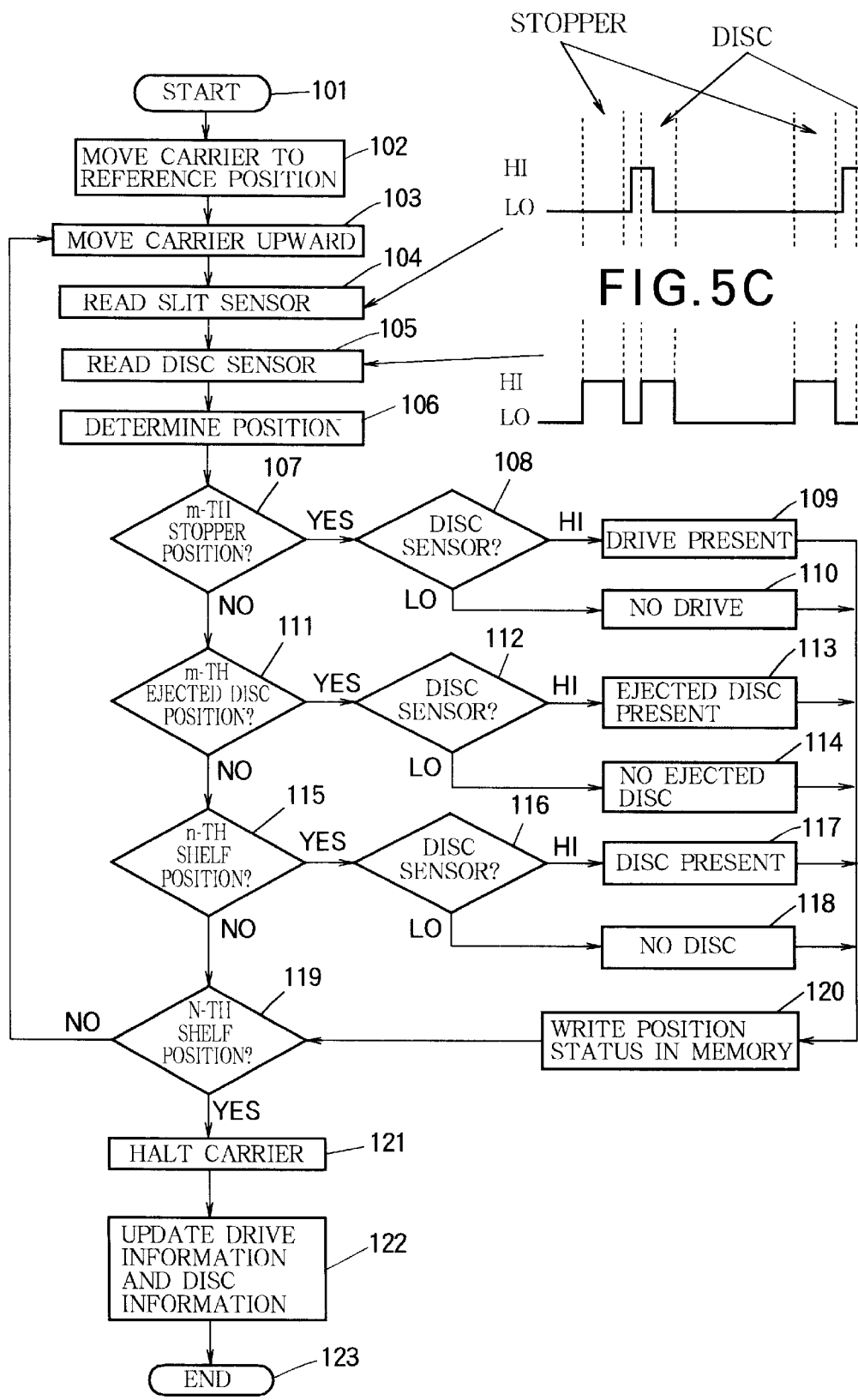
FIG. 5A is a flowchart of an operation by which disc and drive status is checked.

To acquire disc information and drive information, when the disc library apparatus is powered up, after the firmware has been loaded into the read-write memory unit 37, the MPU 33 automatically executes the operation shown in FIG. 5A. The letters 'm' and 'n' denote integers corresponding to possible drive installation positions and shelf positions. N is a positive integer denoting the highest possible shelf position; 'n' takes on values from one to N. The slit plate 7 has M+N slits 9 in addition to the lowermost reference slit. The number of shelves 3 actually present in the apparatus may be less than N, depending on the number of magazines 5 installed.

When this operation starts (step 101), the MPU 33 issues commands to the motor drive circuit 43 that cause the carrier 13 to move downward and stop at the reference position, where the lowermost slit 9 is detected (step 102). The MPU 33 then issues a command for the carrier 13 to move upward (step 103). As the carrier 13 moves upward, the MPU 33 reads the outputs of the slit sensor 27 (step 104) and disc sensor 29 (step 105). By counting the number of slits 9 detected by the slit sensor 27, the MPU 33 determines the position of the carrier 13 (step 106).

The positions recognized by the MPU 33 include the m-th stopper position, which is the position at which a stopper will be detected by the disc sensor 29 if a drive 11 is installed in the m-th position; the m-th ejected disc position, which is the position at which an ejected disc will be detected by the disc sensor 29 if a drive 11 is installed in the m-th position and an ejected disc 1 is present in this drive; and the n-th shelf position, which is the position at which a disc 1 will be detected by the disc sensor 29 if one is present on the n-th shelf 3.

Figure 5B:
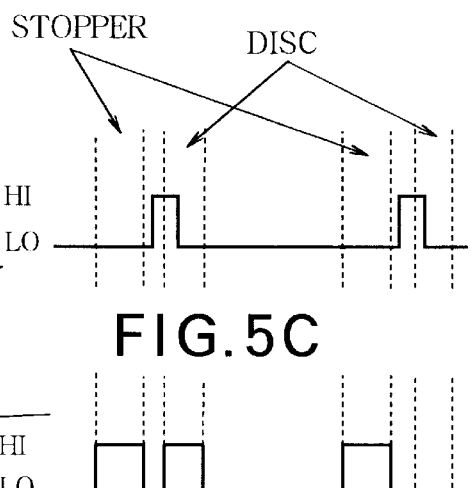
FIG. 5B is a waveform diagram illustrating the output of the slit sensor in this operation.
Figure 5C:
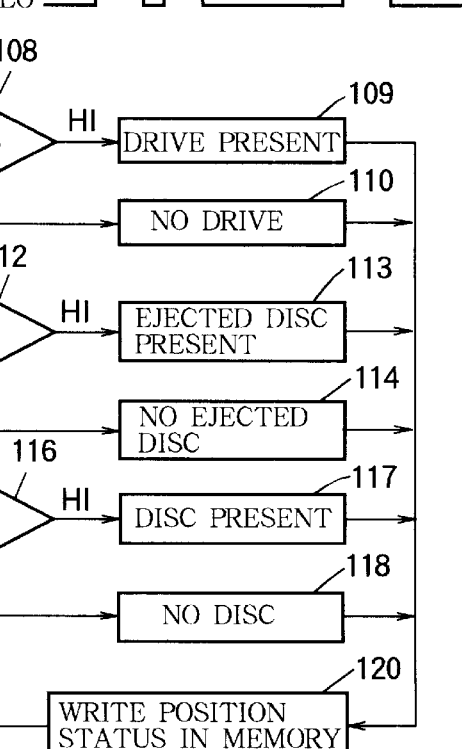
FIG. 5C is a waveform diagram illustrating the output of the disc sensor in this operation.

FIG. 5B shows the waveform output by the slit sensor 27 as the carrier 13 passes two drive positions. FIG. 5C shows the corresponding waveform output by the disc sensor 29, illustrating the detection of a drive with an ejected disc at one position and a drive with no ejected disc at the next position. The drives are detected by the presence of their stoppers.

When the carrier 13 reaches the m-th stopper position (step 107), where m is any integer from one to M, the output of the disc sensor 29 is tested (step 108) to determine whether a drive 11 is installed in the m-th position. If the output of the disc sensor 29 is high (HI), the MPU 33 determines that a drive 11 is present in the m-th position (step 109). If the output of the disc sensor 29 is low (LO), the MPU 33 determines that no drive 11 is present in the m-th position (step 110).

If a drive 11 is present in the m-th position, then when the carrier 13 reaches the m-th ejected disc position (step 111), the output of the disc sensor 29 is tested (step 112) to determine whether an ejected disc 1 is present in this position. If the output of the disc sensor 29 is high, the MPU 33 determines that an ejected disc is present (step 113). If the output of the disc sensor 29 is low, the MPU 33 determines that no ejected disc is present (step 114).

When the carrier 13 reaches the n-th shelf position (step 115), where n is any integer from one to N, the output of the disc sensor 29 is tested (step 116) to determine whether a disc 1 is present on the n-th shelf 3. If the output of the disc sensor 29 is high, the MPU 33 determines that a disc 1 is present (step 117). If the output of the disc sensor 29 is low, the MPU 33 determines that no disc 1 is present (step 118).

These steps are repeated until it is determined that the carrier 13 has reached the highest (N-th) shelf position (step 119). At each repetition, the MPU 33 writes the information obtained from the disc sensor 29 into a positional information area in the read-write memory unit 37, to indicate the disc or drive status at the corresponding positional address (step 120). If any of the drives 11 contain loaded discs, the MPU 33 also writes this information, which is obtained from the I/O LSI 39, into the read-write memory unit 37 as status information at the corresponding address.

When the carrier 13 has reached the top shelf position, the MPU 33 halts the upward motion of the carrier 13 (step 121), and updates the drive information and disc information in the read-write memory unit 37 (step 122) according to the status information that was stored in step 120. This update may include translation of the positional addresses of the drives to SCSI addresses used by the host device. After this operation ends (step 123), the MPU 33 can use the drive information and disc information in responding to commands from the host device, including deciding whether the commands are valid or invalid. The MPU 33 can also inform the host device of the current location and status of installed drives, and the locations where discs are present.

While the disc library apparatus is operating, from time to time a magazine 5 may be added or removed, or a magazine 5 may be temporarily removed to receive new discs and then replaced. Similarly, a drive 11 may be added, removed, or temporarily removed for maintenance and then replaced. After any of these procedures, the MPU 33 automatically carries out an operation similar to that in FIG. 5A to detect any changes in disc or drive status, and update the disc or drive information. In addition, at any necessary time, the host device can issue a command to have the MPU 33 check the shelf status of all magazines 5, or the status of all drives 11, or the status of both, and update the disc information or drive information accordingly. The disc library apparatus may also be provided with switches or buttons for initiating these operations under manual control.

By enabling the apparatus to detect the positions and status of installed drives 11 automatically, the first embodiment enables drives to be added, removed, or replaced without the need to change the firmware of the disc library apparatus.

By detecting the presence of a drive 11 from the presence of its stopper 49, the first embodiment prevents the use of a drive 11 that has been mistakenly installed without a stopper 49, thereby preventing accidents such as dropped or damaged discs that can result from missing stoppers.

These features of the first embodiment result in an apparatus that is easy to operate and maintain.

Next, the second embodiment will be described.

Referring again to FIGS. 2 and 3, in the second embodiment, the drives 11 are mounted in mounting fixtures 47 together with stoppers 49, and the disc sensor 29 senses both the discs 1 and the stoppers 49, as described in the first embodiment. The second embodiment differs from the first embodiment in that the positions of the installed drives 11 are known to the MPU 33 from, for example, information embedded in the firmware stored in the ROM 35, or information stored in a non-volatile memory device in the read-write memory unit 37.

Figure 6:
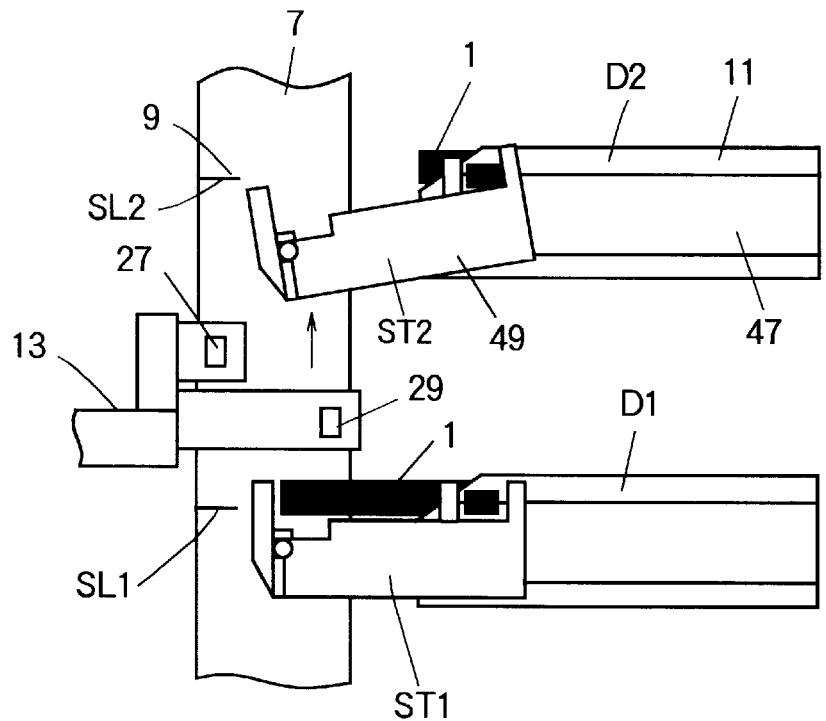
FIG. 6 is a side view illustrating two drives and their stoppers.

FIG. 6 shows two drives 11, denoted D1 and D2, with respective stoppers 49, denoted ST1 and ST2, in positions corresponding to two slits 9, denoted SL1 and SL2. Stopper ST1 is mounted correctly, and is shown stopping an ejected disc 1 in the intended manner. Stopper ST2 is mounted in an incorrect position, and is incapable of properly stopping an ejected disc.

Figure 7:
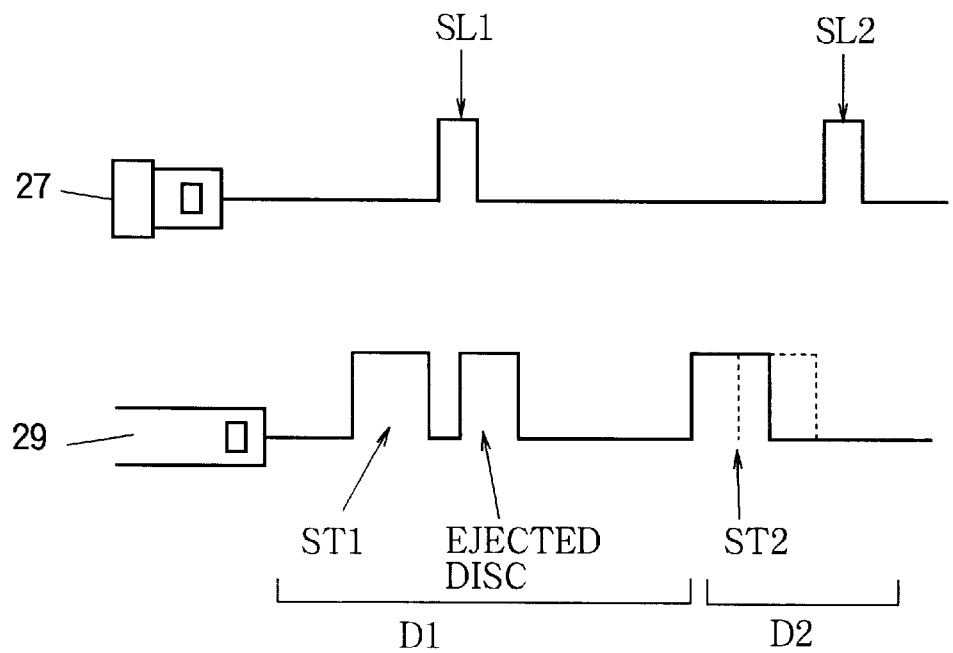
FIG. 7 is a waveform diagram illustrating the detection of the stoppers in FIG. 6.

FIG. 7 shows the waveforms output by the slit sensor 27 and disc sensor 29 as the carrier 13 moves upward past the two drives D1 and D2 in FIG. 6. The high pulse representing the detection of stopper ST1 occurs just before the high pulse representing the detection of slit SL1. The next high pulse output by the disc sensor 29 indicates the ejected disc in drive D1. The next high pulse from the disc sensor 29, indicating the incorrectly installed stopper ST2, is shifted forward from its normal position (shown by the dotted line) in relation to the pulse from the slit sensor 27 indicating slit SL2.

The firmware of the disc library apparatus in the second embodiment includes values indicating expected timing relationships between the pulses output by the slit sensor 27 and disc sensor 29 when a stopper 49 is detected in the correct position in relation to the position of a drive 11. For example, the expected duration of the pulse indicating the stopper 49 may be stored, together with the maximum allowable delay from this pulse to the pulse indicating the slit 9.

When the disc library apparatus is first powered up, the MPU 33 moves the carrier 13 past each known drive position and compares the waveforms output by the slit sensor 27 and disc sensor 29 with the stored values. If a stopper 49 produces an abnormal waveform, or if no stopper 49 is detected at a known drive position, the MPU 33 notifies the host device, so that prompt action can be taken to correct the situation. The MPU 33 also updates the drive information stored in the read-write memory unit 37 to indicate that the drive 11 with the faulty stopper 49 must not be used. In FIG. 6, drive D1 is used but drive D2 is not.

During the operation of the disc library apparatus, the MPU 33 continues to monitor the waveforms of the stopper 49. If an abnormal waveform is detected, possibly because a stopper 49 has been deformed or has moved to an incorrect position, the corresponding drive 11 is taken out of service.

As illustrated in FIG. 7, the pulse indicating an ejected disc closely follows the pulse of the stopper 49. Depending on the shape of the stopper 49, the two pulses may be difficult to distinguish. In that case, if an abnormally long pulse is detected, the MPU 33 assumes that an ejected disc 1 may be present and either loads the disc into the drive 11 or returns the disc to an empty shelf 3, then checks the waveform of the stopper 49 again.

By detecting missing, deformed, or incorrectly positioned stoppers 49, the second embodiment prevents disc ejection accidents and possible equipment damage.

The first and second embodiments can be combined. The MPU 33 can detect the presence or absence of drives 11 from the presence or absence of their stoppers 49, and also detect incorrectly positioned or deformed stoppers 49 from the shape and timing of the sensor waveforms.

Next, the third embodiment will be described.

Figure 8:
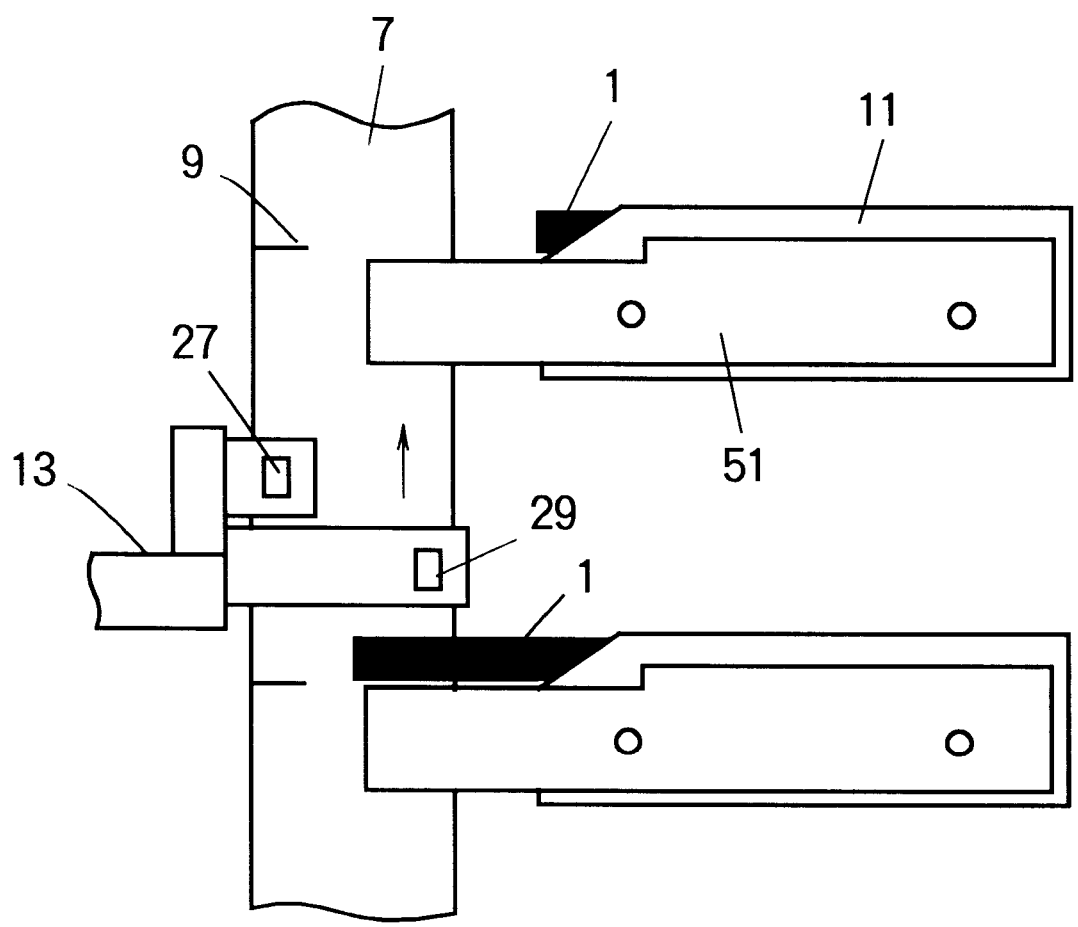
FIG. 8 is a side view illustrating two drives in a third embodiment of the invention.

Referring to FIG. 8, the drives. 11 in the third embodiment are mounted in mounting fixtures 51 that extend far enough forward to be detected by the disc sensor 29. Stoppers (not visible) may also be provided, but they do not have to be mounted in a position detectable by the disc sensor 29. The apparatus has M positions in which drives 11 the disc sensor 29. The shape of the mounting fixtures 51 can be optimized for accurate position detection.

A third advantage is that the shape of the stoppers (if present) in the third embodiment is not constrained by the need for the stoppers to be detectable by the disc sensor 29.

By detecting the positions of installed drives 11 accurately and automatically, the third embodiment simplifies the installation and replacement of drives 11. For example, the drives 11 do not necessarily have to be aligned accurately with the slits 9, because their positions can be detected accurately from the positions of their mounting fixtures 51.

The third embodiment is also capable of detecting a drive 11 that is mounted without a stopper.

Next, the fourth embodiment will be described.

Figure 9A:
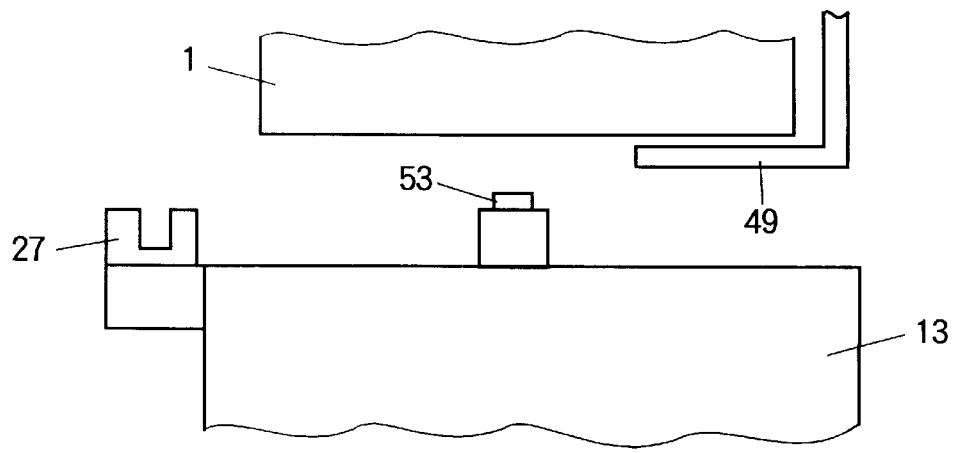
FIG. 9A is a partial top view of a disc library apparatus illustrating a fourth embodiment of the invention.

Referring to the partial plan view in FIG. 9A, each drive 11 in the fourth embodiment is provided with a stopper 49 for restraining ejected discs 1. To detect the ejected discs 1, and discs stored on the shelves 3, the fourth embodiment employs a reflective optical disc sensor 53. The disc sensor 53 is mounted on the front of the carrier 13, facing the discs 1 and drives 11. The disc sensor 53 comprises a light-emitting element and a light-sensing element (not visible) enclosed in a single housing. When the disc sensor 53 is positioned at the same height as a disc 1, some of the light emitted from the light-emitting element is reflected from the front edge of the disc 1 back to the disc sensor 53. When the disc is in the ejected position, resting against the stopper 49 as shown, the optical path between the disc sensor 53 and the edge of the disc 1 is short, and the reflected light is readily detected by the light-sensing element in the disc sensor 53.

Figure 9B:
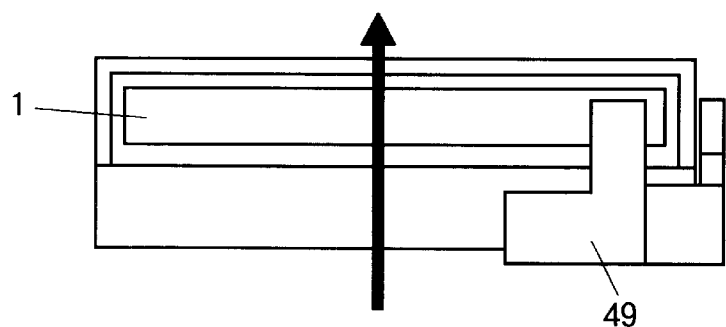
FIG. 9B is a partial frontal view of the apparatus in FIG. 9A.

The arrow in the frontal view in FIG. 9B depicts the path of the spot of light emitted by the disc sensor as the may be mounted, where M is an integer greater than one, but not all of the M positions need be occupied.

The read-write memory unit 37 in the third embodiment stores drive information indicating the number of installed drives 11 and the positions they occupy, and disc information indicating the positions of shelves 3 on which discs currently reside, the positions of drives 11 in which discs 1 are currently loaded, and the positions of drives 11 in which ejected discs 1 remain. To acquire initial disc information and drive information, when the disc library apparatus is powered up, after the firmware has been loaded into the read-write memory unit 37, the MPU 33 automatically executes an operation substantially identical to the operation shown in FIG. 5A, moving the carrier 13 upward past each drive position and shelf position, and using the disc sensor 29 to detect the presence of drives 11 and discs 1. The presence of a drive 11 is recognized from the presence of its mounting fixtures 51, instead of from the presence of its stopper as in the first embodiment. A repeated description of the operation in FIG. 5A will be omitted.

If a drive 11 is added or replaced during operation of the disc library apparatus, the MPU 33 again uses the disc sensor 29 to detect the position of its mounting fixture 51, and updates the drive information accordingly.

One advantage of detecting the mounting fixture 51 instead of the stopper is that the mounting fixture 51 is a rigid member disposed in a precise positional relationship to the drive 11, enabling the position of the drive 11 to be detected with high accuracy. The stopper is generally not so rigid and not so precisely positioned.

A second advantage is that the shape of the mounting fixtures 51 is less constrained than the shape of the stoppers, and can be more easily adapted for detection by carrier moves upward. The amount of reflected light returning to the disc sensor from the face of the drive 11, or from a disc 1 in the loaded position, is less than the amount returning from a disc 1 in the ejected position, because the optical path is longer. The stopper 49 is not in the path of the emitted light.

Figure 9C:
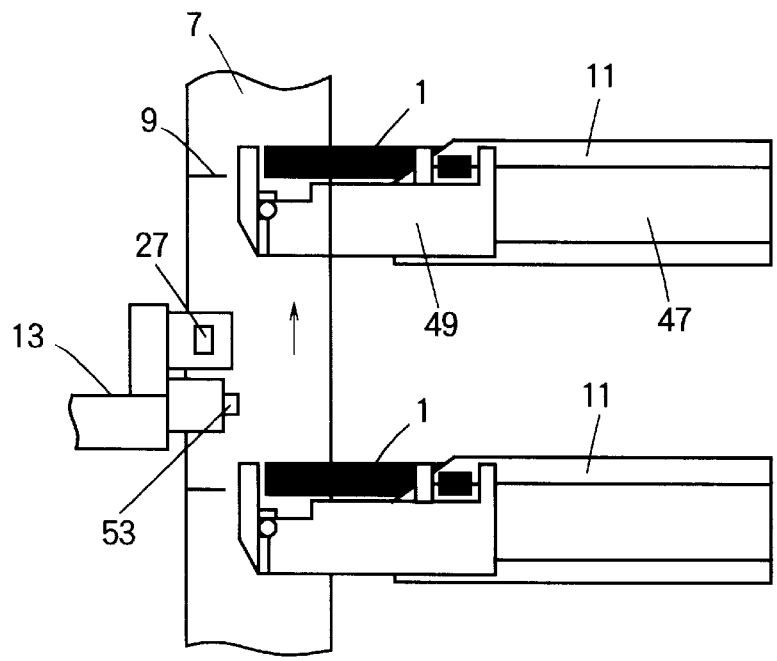
FIG. 9C is a partial side view of the apparatus in FIG. 9A.

The side view in FIG. 9C shows the carrier 13 at a position between two drives 11. In this position, the disc sensor 53 does not detect reflected light.

The MPU 33 in the fourth embodiment uses the disc sensor 53 to acquire disc information when the disc library apparatus is powered up, by detecting the sensor signals produced by shelved discs and ejected discs. The weaker sensor signals produced by loaded discs, and by the drives 11 themselves, are ignored. Loaded discs are detected from electrical signals output by the drives 11.

When a magazine 5 is added or replaced, the MPU 33 uses the disc sensor 53 to check which shelves 3 of the magazine 5 are occupied by discs.

Compared with a transmissive optical sensor, the reflective optical disc sensor 53 has several advantages. It is more compact, requires less wiring, places fewer constraints on the design of the apparatus, and does not require precise alignment between the light-emitting and light-sensing elements.

Next, the fifth embodiment will be described.

Figure 10A:
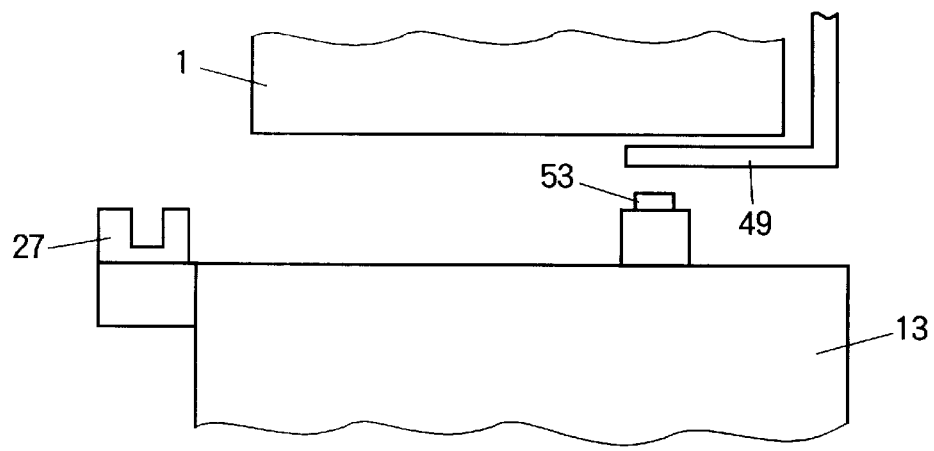
FIG. 10A is a partial top view of a disc library apparatus illustrating fifth and sixth embodiments of the invention.

Referring to the partial plan view in FIG. 10A, each drive in the fifth embodiment is provided with a stopper 49 for restraining ejected discs 1. To detect the ejected discs and shelved discs, the fifth embodiment employs a reflective optical disc sensor 53. The disc sensor 53 is mounted on the front of the carrier 13, facing the discs 1 and stoppers 49. The disc sensor 53 comprises a light-emitting element and a light-sensing element (not visible) enclosed in a single housing. When the disc sensor 53 is positioned at the same height as a disc 1 or stopper 49, some of the light emitted from the light-emitting element is reflected from the front edge of the disc 1 or stopper 49 back to the disc sensor 53. The optical path between the disc sensor 53 and an ejected disc 1 or stopper 49 is short, and the reflected light is readily detected by the light-sensing element.

Figure 10B:
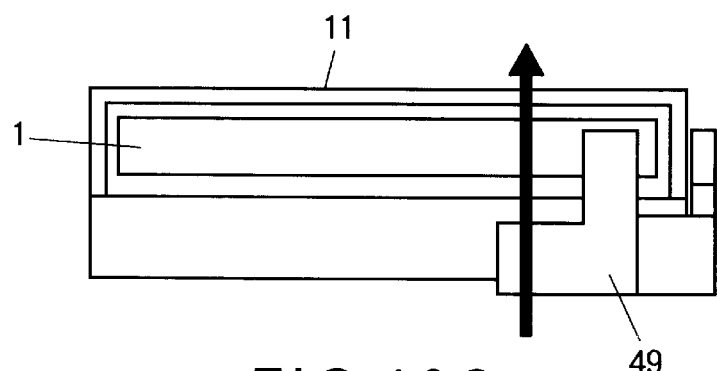
FIG. 10B is a partial frontal view of the apparatus in FIG. 10A.

Referring to the frontal view in FIG. 10B, the stoppers 49 are L-shaped, ejected discs 1 being restrained by the high part of the L. The path of the spot of light emitted by the disc sensor 53 crosses the low part of the L, so that the disc sensor 53 can sense both light reflected from the stopper 49 and light reflected from an ejected disc 1, if one is present. The weaker signal produced by light reflected from the face of a drive 11 or from a loaded disc 1 is ignored.

Figure 10C:
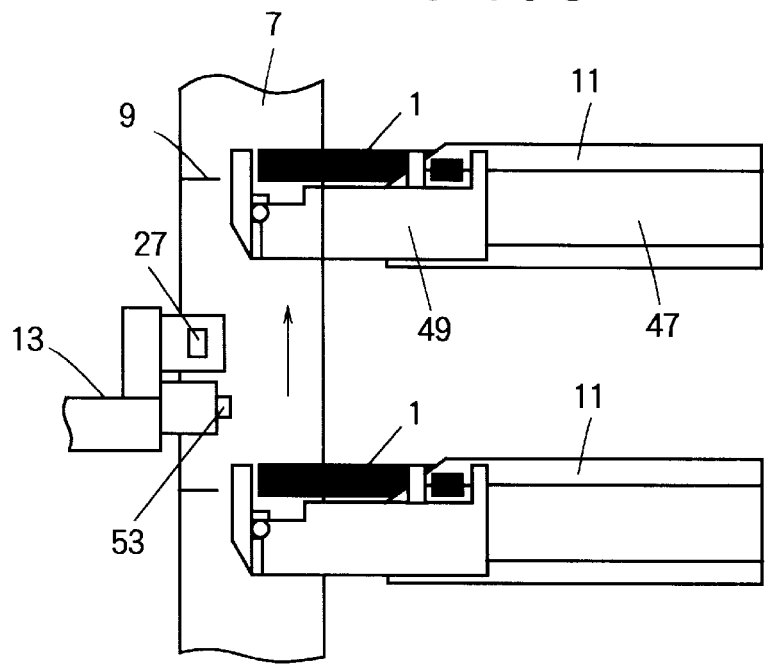
FIG. 10C is a partial side view of the apparatus in FIG. 10A.

Referring to FIG. 10C, no reflected light is detected when the carrier 13 is positioned between drives 11.

The fifth embodiment operates as described in the first embodiment, using the procedure shown in the flowchart in FIG. 5A to acquire initial disc information and drive information when the disc library apparatus is powered up, drives 11 being detected by the presence of their stoppers 49.

As described in the first embodiment, the fifth embodiment simplifies the installation and removal of drives 11, and prevents accidents due to missing stoppers 49. The fifth embodiment also provides the advantages of a reflective optical sensor configuration that is more compact than a transmissive optical sensor configuration, requires less wiring, places fewer constraints on the design of the apparatus, and does not requiring precise alignment between the light-emitting and light-sensing elements.

Next, the sixth embodiment will be described. The sixth embodiment combines the features of the second and fifth embodiments.

The sixth embodiment has a reflective optical disc sensor 53 mounted in the same position as in the fifth embodiment, as shown in FIGS. 10A, 10B, and 10C. The light reflected from correctly and incorrectly mounted stoppers 49 produces sensor output waveforms similar to those shown in FIG. 7. The high and low levels of the waveform output from the disc sensor 53 may be reversed, but the timing of the waveforms is the same as in FIG; 7. As in the second embodiment, the firmware includes data describing the expected waveform produced by a correctly mounted stopper 49. The MPU 33 compares the waveform actually detected with the expected waveform, and issues an alarm if the two are dissimilar, or if no stopper waveform is detected at a known drive position.

Like the second embodiment, the sixth embodiment prevents disc ejection accidents due to missing, deformed, or incorrectly mounted stoppers 49. The sixth embodiment also provides a compact sensor configuration with reduced wiring requirements and reduced design constraints, not requiring alignment of light-emitting and light-sensing elements.

Next, the seventh embodiment will be described.

Figure 11:
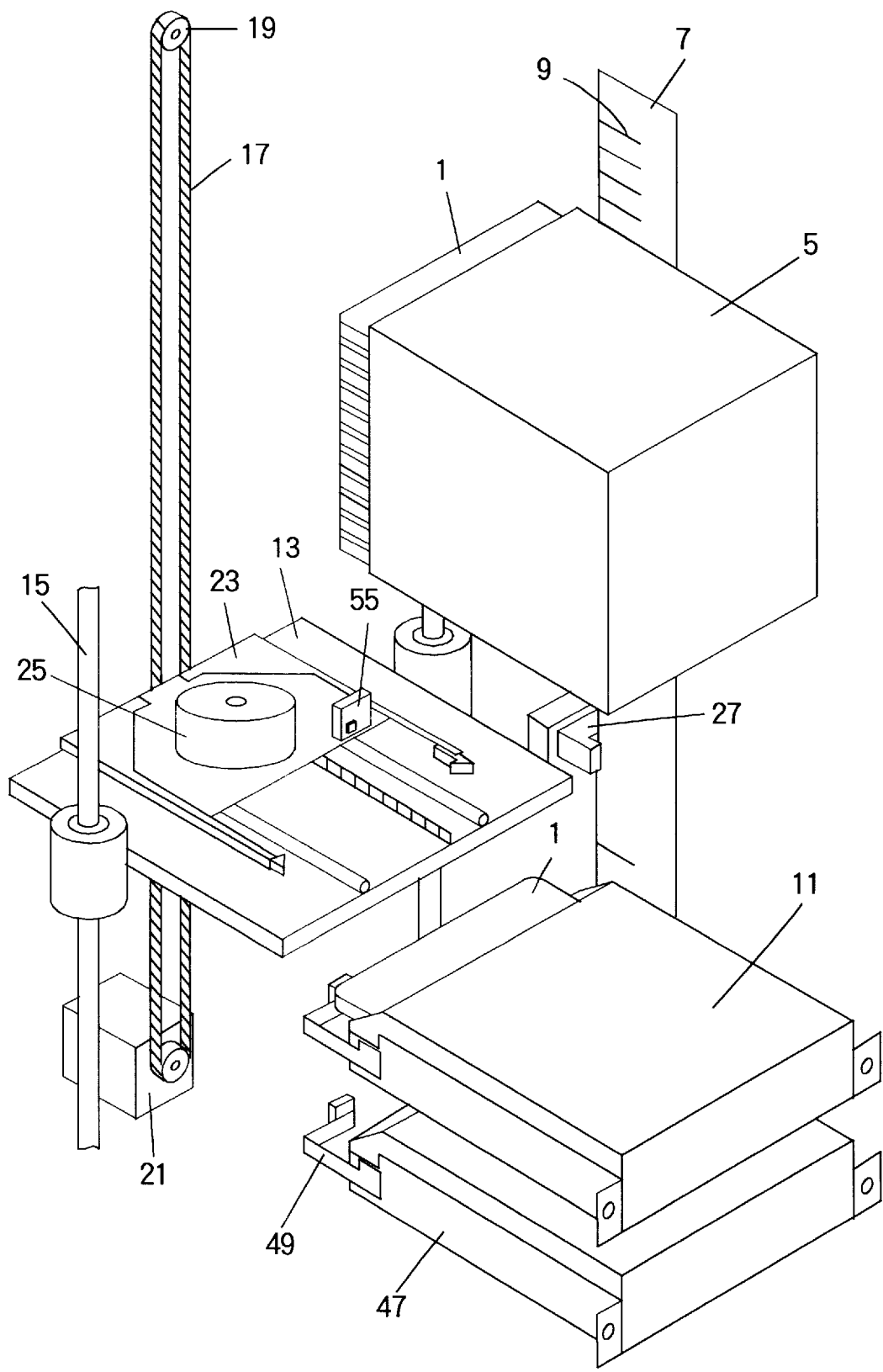
FIG. 11 is a perspective drawing of a disc library apparatus illustrating a seventh embodiment of the invention.

Referring to FIG. 11, in the seventh embodiment, the drives 11 are mounted in mounting fixtures 47, together with respective stoppers 49. A chucking sensor 55 of the reflective optical type is mounted at the front of the picker 23. Besides being moved forward and retracted for picking up, loading, and transporting discs 1, the picker 23 is controlled to move to a disc detection position intermediate between the forward and retracted positions. The disc detection position is close to the forward position used for picking up shelved discs and ejected discs, but is far enough back from the forward position that when the picker 23 is disposed at the disc detection position, the picker 23 does not grip the disc.

To transport a disc 1 from one location to another, the carrier 13 moves to the present location of the disc 1. The picker 23 moves forward, grips the disc 1, and retracts, drawing the disc 1 onto the carrier 13, which then moves vertically toward the destination location. At the destination location, the picker 23 moves forward, releases the disc 1, then retracts again. During these operations, the chucking sensor 55 detects the presence of the disc 1, confirms that the disc 1 has been drawn onto the carrier 13, and confirms that the disc 1 has been released.

The chucking sensor 55 is also used to check the positions at which discs 1 are present, without picking up or moving the discs. This operation is carried out when the disc library apparatus is powered up, and at other times as necessary, such as when a magazine 5 is added or replaced. To carry out this operation, the MPU 33 controls both the belt motor 21 and the picker motor 25. The carrier 13 is moved to the installed drive positions and shelf positions one by one, stopping at each position. When the carrier 13 stops, the picker 23 moves to the disc detection position. In this position, the chucking sensor 55 can detect the presence of discs 1 stored on shelves 3, and ejected discs 1 in drives 11, but as noted above, the picker 23 does not grip the detected discs.

The chucking sensor 55 does not detect the presence or absence of the drives 11 and stoppers 49. For this reason, the chucking sensor 55 does not constrain the design of the drives 11 and stoppers 49. Furthermore, constraints on the design of the carrier 13 are reduced because there is no separate disc sensor, and the cost of the apparatus is reduced for the same reason.

The invention has been described in relation to a disc library apparatus in which the magazines 5 and drives 11 are aligned vertically and the carrier 13 moves vertically, but the invention can also be practiced in apparatus in which the magazines 5 and drives 11 are aligned horizontally and the carrier 13 travels horizontally.

Those skilled in the art will recognize that further variations are possible within the scope claimed below.

What is claimed is:

1. A disc library apparatus having a plurality of shelves for storing discs, a drive loadable with a selectable one of the discs, for accessing information on the loaded disc, then ejecting the loaded disc, and a motor-driven carrier for transporting the discs between the shelves and the drive, comprising:

a stopper mounted together with said drive, for restraining discs ejected from said drive;

a disc sensor mounted on said carrier, for detecting the discs stored on the shelves, detecting the discs ejected from said drive, and detecting said stopper; and a control unit coupled to said disc sensor, controlling said drive and said carrier, disabling use of said drive if said stopper is not detected by said disc sensor.

2. The apparatus of claim 1, wherein said drive is one of a plurality of drives installable at different positions in said disc library apparatus, and said control unit comprises:

a read-write memory unit storing drive information indicating which of said positions are occupied by said drives; and a processing unit automatically updating said drive information according to detection of stoppers at said positions by said disc sensor.

3. The apparatus of claim 1, wherein said control unit has a memory, said drive is installed in a position described in said memory, said control unit uses said disc sensor to detect whether said stopper is installed in a correct position in relation to said drive, and said control unit disables the use of said drive if said stopper is not installed in said correct position.

4. The apparatus of claim 1, wherein said disc sensor is a reflective optical sensor.

5. The apparatus of claim 1, further comprising:

a slit plate having a plurality of slits; and a slit sensor mounted on said carrier, for detecting said slits and notifying said control unit; wherein said control unit has a processing unit that positions said carrier by counting the slits detected by said slit sensor.

6. A disc library apparatus having a plurality of shelves disposed in different positions for storing discs, at least one drive installable at different positions, loadable with a selectable one of said discs, generating a signal indicating presence of the loaded disc, accessing information on the loaded disc, then ejecting the loaded disc, and a motor-driven carrier for transporting the discs between the shelves and the drive, comprising:

a disc sensor mounted on said carrier; and a control unit coupled to said disc sensor, having a read-write memory unit storing drive information indicating the position of each said drive, and disc information indicating positions of said discs; and a processing unit controlling each said drive and said carrier, automatically acquiring and updating said drive information and said disc information by moving said carrier to the positions at which each said drive is installable and the positions of said shelves, using said disc sensor to detect each said drive, detect the discs ejected from each said drive, and detect the discs stored on said shelves, and using said signal to detect whether one of the discs is loaded in each said drive.

7. The apparatus of claim 6, wherein each said drive has a mounting fixture, and said processing unit detects said drive by using said disc sensor to detect a mounting fixture.

8. The apparatus of claim 6, wherein each said drive has a stopper for restraining the discs ejected from said drive, and said processing unit detects said drive by using said disc sensor to detect said stopper.

9. The apparatus of claim 6, wherein said disc sensor is a reflective optical sensor.

10. The apparatus of claim 6, further comprising:

a slit plate having a plurality of slits; and a slit sensor mounted on said carrier, for detecting said slits and notifying said control unit;

wherein said processing unit positions said carrier by counting the slits detected by said slit sensor.

11. A disc library apparatus having a plurality of shelves for storing discs, at least one drive loadable with a selectable one of said discs, accessing information on the loaded disc, then ejecting the loaded disc, a motor-driven carrier for transporting the discs between the shelves and the drive, and a control unit controlling the drive and the carrier, comprising:

a reflective optical sensor mounted on said carrier, detecting said discs when said discs are stored on said shelves, and when said discs are in an ejected position due to ejection from said drive, and notifying said control unit.

12. The apparatus of claim 11, wherein said carrier has a picker on which said reflective optical sensor is mounted, said picker moves to a forward position to pick up the discs stored on said shelves and the discs ejected from said drive, said reflective optical sensor detects whether said discs have been picked up, said picker moves to a retracted position for carrying said discs on said carrier, said reflective optical sensor detects whether said discs are being carried, and said picker moves to an intermediate position at which said discs are detected by said reflective optical sensor without being picked up by said picker, said intermediate position being disposed between said forward position and said retracted position.

13. The apparatus of claim 11, wherein said carrier has a front edge facing said shelves and said drive, and said reflective optical sensor is mounted on said front edge.

14. The apparatus of claim 11, wherein said drive has a stopper for restraining the discs ejected from said drive, said reflective optical sensor detects said stopper, and said control unit disables use of said drive if said stopper is not detected by said reflective optical sensor.

15. The apparatus of claim 11, further comprising:

a slit plate having a plurality of slits; and a slit sensor mounted on said carrier, for detecting said slits and notifying said control unit; wherein said control unit has a processing unit that positions said carrier by counting the slits detected by said slit sensor.

* * * * *